United States Patent
Kraft et al.

(10) Patent No.: US 10,855,211 B2
(45) Date of Patent: Dec. 1, 2020

(54) SELF-CALIBRATION OF ECM MOTOR AND VARIABLE FREQUENCY DRIVE INFERRED TORQUE

(71) Applicant: Trane International Inc., Davidson, NC (US)

(72) Inventors: Wayne N. Kraft, Tyler, TX (US); Chuan Yan, Tyler, TX (US)

(*) Notice: Subject to any disclaimer, the term of this patent is extended or adjusted under 35 U.S.C. 154(b) by 201 days.

(21) Appl. No.: 15/917,193

(22) Filed: Mar. 9, 2018

(65) Prior Publication Data
US 2019/0280630 A1 Sep. 12, 2019

(51) Int. Cl.
*H02P 6/08* (2016.01)
*H02P 6/06* (2006.01)
*H02P 6/04* (2016.01)

(52) U.S. Cl.
CPC .............. *H02P 6/08* (2013.01); *H02P 6/06* (2013.01); *H02P 2006/045* (2013.01)

(58) Field of Classification Search
CPC ......... H02P 6/08; H02P 6/06; H02P 2006/045
See application file for complete search history.

(56) References Cited

U.S. PATENT DOCUMENTS

| 4,638,233 A | 1/1987 | Erdman |
| 4,860,231 A | 8/1989 | Ballard et al. |
| 5,159,254 A * | 10/1992 | Teshima ............ G05B 19/4063 318/610 |
| 6,046,554 A | 4/2000 | Becerra |
| 6,320,338 B1 * | 11/2001 | Kang ...................... G01L 3/24 318/430 |
| 6,877,837 B1 * | 4/2005 | Igarashi ................ B41J 19/202 318/616 |
| 8,710,777 B2 * | 4/2014 | Tian ................... G05B 13/0265 318/400.1 |
| 2011/0303252 A1 * | 12/2011 | Marioni ............... D06F 37/203 134/56 R |
| 2015/0226444 A1 * | 8/2015 | Sasaki .................. G05D 7/0629 700/276 |
| 2017/0045870 A1 * | 2/2017 | Yang ...................... H02P 23/14 |

FOREIGN PATENT DOCUMENTS

CA 1279915 C 2/1991

* cited by examiner

*Primary Examiner* — Bickey Dhakal
(74) *Attorney, Agent, or Firm* — Womble Bond Dickinson (US) LLP

(57) ABSTRACT

A method for calibrating a motor is provided. The method includes defining a reference speed for operating the motor; operating the motor until a first operating point at which the motor reaches the reference speed; measuring a first current of the motor and an angular acceleration associated with the first current at the first operating point; operating the motor until a second operating point at which the motor reaches the reference speed; measuring a second current of the motor at the second operating point; and estimating a calibration coefficient for calibrating the motor based at least on the first current, the second current, and the angular acceleration associated with the first current.

14 Claims, 5 Drawing Sheets

SELF-CALIBRATION OF ECM MOTOR AND VARIABLE FREQUENCY DRIVE INFERRED TORQUE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Variable-speed motors such as electronically commutated motors (ECMs) are generally considered to be efficient and reliable motors. As such, ECMs are commonly used for a wide range of applications such as in heating, ventilation, and/or air conditioning (HVAC) systems, industrial engineering systems, motion control systems, etc. Due to various factors such as variations in parts, load, and motor resistance, an ECM may undergo a calibration procedure to account for such variations.

SUMMARY OF THE DISCLOSURE

In an embodiment, a control system is provided including a motor and a control unit coupled to the motor. The control unit is configured to calibrate the motor by defining a reference speed for operating the motor; responsive to operating the motor until a first operating point at which the motor reaches the reference speed, measuring a first current of the motor and an angular acceleration associated with the first current at the first operating point; responsive to operating the motor until a second operating point at which the motor reaches the reference speed, measuring a second current of the motor at the second operating point; and estimating a calibration coefficient for calibrating the motor based at least on the first current, the second current, and the angular acceleration associated with the first current.

In another embodiment, a method for calibrating a motor is provided. The method includes defining a reference speed for operating the motor; responsive to operating the motor until a first operating point at which the motor reaches the reference speed, measuring a first current of the motor and an angular acceleration associated with the first current at the first operating point; responsive to operating the motor until a second operating point at which the motor reaches the reference speed, measuring a second current of the motor at the second operating point; and estimating a calibration coefficient for calibrating the motor based at least on the first current, the second current, and the angular acceleration associated with the first current.

In yet another embodiment, a non-transitory computer medium is provided storing computer readable instructions executable by a processor to implement a method for calibrating a motor. The method includes defining a reference speed for operating the motor; responsive to operating the motor until a first operating point at which the motor reaches the reference speed, measuring a first current of the motor and an angular acceleration associated with the first current at the first operating point; responsive to operating the motor until a second operating point at which the motor reaches the reference speed, measuring a second current of the motor at the second operating point; and estimating a calibration coefficient for calibrating the motor based at least on the first current, the second current, and the angular acceleration associated with the first current.

For the purpose of clarity, any one of the embodiments disclosed herein may be combined with any one or more other embodiments disclosed herein to create a new embodiment within the scope of the present disclosure.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Thus, while the present disclosure may generally focus on ECMs employed in HVAC applications, it is to be understood that the present disclosure is applicable to any suitable type of motors and applications.

Measurement devices such as a dynamometer may be used to determine the torque generated by an ECM. In turn, the ECM may be calibrated to provide a torque level needed to achieve a desired operating condition such as airflow. Such calibration procedures often take place on an assembly line such as in a factory where ECMs are installed. For example, when an ECM is installed in an air handling unit, the ECM and corresponding drive (i.e., power electronics to operate that ECM) may be calibrated together at the factory so that post-installation calibration may be avoided. However, further calibration may still be necessary in some cases. For example, the ECM and drive may need to be recalibrated if either one is eventually replaced, e.g., due to wear or damage. Similarly, some merchants may opt to purchase the ECM and drive separately, and therefore, those merchants may need to individually calibrate the ECM and drive during assembly. In such cases where the ECM and drive are separately acquired and assembled, some sort of facility or test fixture may be employed to perform the calibration, which may be relatively complex and time-consuming (e.g., as compared to calibrating the ECM and drive via an assembly line). Disclosed herein are embodiments for dynamically calibrating a motor and drive with or without a facility or test fixture.

Figure 1:
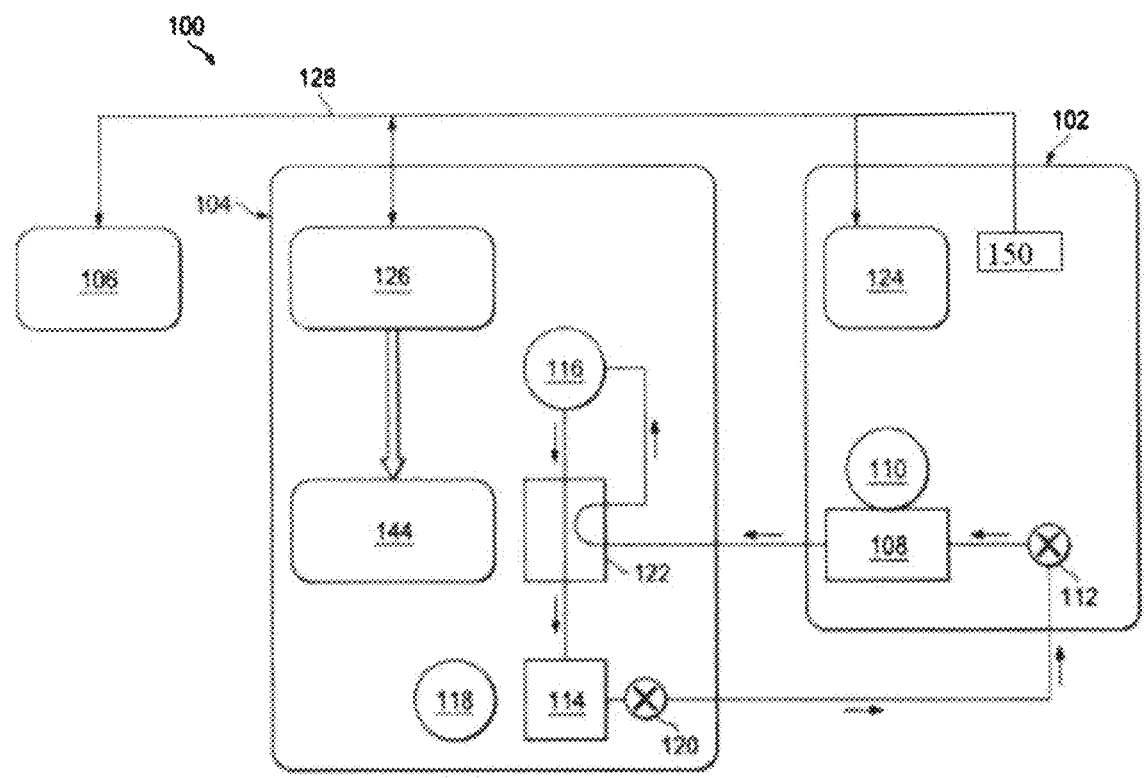
FIG. 1 is a schematic diagram of a heating, ventilation, and/or air conditioning (HVAC) system according to an embodiment of the disclosure.

Referring now to FIG. 1, a schematic diagram of a heating, ventilation, and/or air conditioning (HVAC) system 100 is shown according to an embodiment of the disclosure. Most generally, the HVAC system 100 may be configured to implement one or more substantially closed thermodynamic refrigeration cycles to provide a cooling functionality (hereinafter "cooling mode") and/or a heating functionality (hereinafter "heating mode"). The HVAC system 100 may comprise an indoor unit 102, an outdoor unit 104, and a system controller 106 that may generally control operation of the indoor unit 102 and/or the outdoor unit 104. While HVAC system 100 is shown as a so-called split system comprising an indoor unit 102 located separately from the outdoor unit 104, alternative embodiments of the HVAC system 100 may comprise a so-called package system in which one or more of the components of the indoor unit 102 and one or more of the components of the outdoor unit 104 are carried together in a common housing or package.

The indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise an axial fan comprising a fan blade assembly and a fan motor configured to selectively rotate the fan blade assembly. Additionally or alternatively, the indoor fan 110 may comprise a variable speed blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of a climate controlled structure. The indoor fan 110 may generally be configured as a modulating and/or variable speed fan capable of being operated at many speeds over one or more ranges of speeds.

In some embodiments, the indoor fan 110 may comprise a single speed fan. In other embodiments, the indoor fan 110 may be configured as a multiple speed fan capable of being operated at a plurality of operating speeds by selectively electrically powering different ones of multiple electromagnetic windings of a motor of the indoor fan 110. Additionally or alternatively, indoor fan 110 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. While the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

The outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. According to some implementations, the outdoor heat exchanger 114 may comprise a plate-fin heat exchanger. According to other implementations, the outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In alternative embodiments, the compressor 116 may comprise a modulating compressor that is capable of operation over a plurality of speed ranges, a reciprocating-type compressor, a single speed compressor (or any other suitable refrigerant compressor), and/or refrigerant pump. According to some implementations, the compressor 116 may be controlled by a compressor drive controller 144, also referred to as a compressor drive and/or a compressor drive system.

The outdoor fan 118 may generally comprise an axial fan comprising a fan blade assembly and a fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the outdoor heat exchanger 114. The outdoor fan 118 may generally be configured as a modulating and/or variable speed fan capable of being operated at a plurality of speeds over a plurality of speed ranges. Additionally or alternatively, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In some embodiments, the outdoor fan 118 may be a single speed fan.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. While the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flowpath of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. The system controller 106 may also be configured to monitor and/or communicate with a plurality of temperature sensors associated with components of the indoor unit 102, the outdoor unit 104, and/or the ambient outdoor temperature. According to some implementations, the system controller 106 may comprise a temperature sensor and/or a humidity sensor and/or may further be configured to control heating and/or cooling of zones associated with the HVAC system 100. Additionally or alternatively, the system controller 106 may be configured as a thermostat for controlling the supply of conditioned air to zones associated with the HVAC system 100.

The system controller 106 may also generally comprise an input/output (I/O) unit such as a graphical user interface (GUI), a touchscreen interface, or any suitable interface for displaying information and/or receiving user inputs. The system controller 106 may display information related to the operation of the HVAC system 100 and may receive user inputs related to the operation of the HVAC system 100. However, the system controller 106 may further be operable to display information and receive user inputs tangentially and/or unrelated to operation of the HVAC system 100. In some implementations, the system controller 106 may not comprise a display and may derive all information from inputs from remote sensors and remote configuration tools.

In some embodiments, the system controller 106 may be configured for selective bidirectional communication over a communication bus 128. According to one aspect, portions of the communication bus 128 may comprise a three-wire connection suitable for communicating messages between the system controller 106 and one or more of the HVAC system 100 components configured for interfacing with the communication bus 128.

The indoor controller 124 may be carried by the indoor unit 102 and may generally be configured to receive information inputs, transmit information outputs, and/or otherwise communicate with the system controller 106, the outdoor controller 126, and/or any other device via the communication bus 128 and/or any other suitable medium of communication. In some embodiments, the indoor controller 124 may be configured to receive information related to a speed of the indoor fan 110, transmit a control output to an auxiliary heat source, transmit information regarding an indoor fan 110 volumetric flow-rate, communicate with and/or otherwise affect control over an air cleaner, and communicate with an indoor EEV controller. In addition, the indoor controller 124 may be configured to communicate with an indoor fan 110 controller and/or otherwise affect control over operation of the indoor fan 110.

The outdoor controller 126 may be carried by the outdoor unit 104 and may be configured to receive information inputs, transmit information outputs, and/or otherwise communicate with the system controller 106, the indoor controller 124, any other device via the communication bus 128, and/or any other suitable medium of communication. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In addition, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may flow from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to a two-phase (vapor and gas) mixture. The two-phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108, and causing evaporation of the liquid portion of the two-phase mixture. The refrigerant may thereafter re-enter the compressor 116 after passing through the reversing valve 122.

In some embodiments, the HVAC 100 system may comprise a heat source such as a furnace, which be configured to burn fuel such as natural gas, heating oil, propane, coal, and/or any suitable material capable of generating heat or power. In such embodiments, the furnace 150 may comprise an inducer blower (e.g., similar to the indoor fan 110) configured to circulate air-fuel mixture through the furnace 150.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
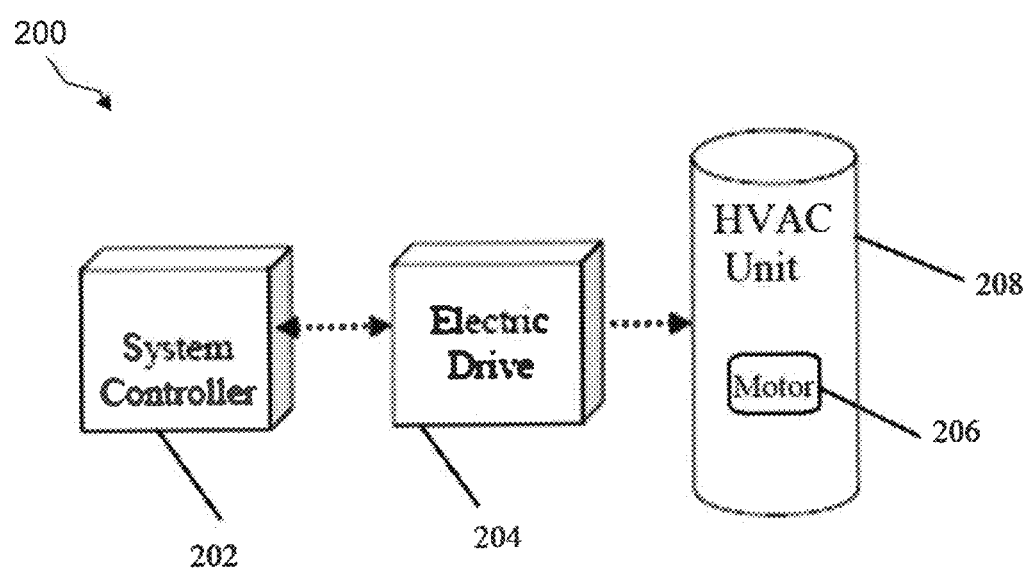
FIG. 2 is a block diagram of a control system according to an embodiment of the disclosure.

Referring now to FIG. 2, a block diagram of a control system 200 is shown according to an embodiment of the disclosure. The control system 200 comprises a system controller 202 coupled to an electric drive module 204, which may be configured to power a motor 206. In some embodiments, the system controller 202 and the electric drive module 204 may each be implemented on separate chips such as integrated circuits (ICs), which may each comprise one or more components such as a microprocessor, microcontroller, I/O circuitry, and memory configured to store instructions/code executable by the system controller 202 and the electric drive module 204, respectively. In other embodiments, the system controller 202 and the electric drive module 204 may be integrated as a single unit such as an IC comprising one or more of the foregoing components.

In some embodiments, the motor 206 comprises an ECM. In other embodiments, however, the motor 206 may comprise any suitable type of motor, such as a magnetic motor, a mechanical commutator motor, a direct current (DC) motor, an alternating current (AC) motor, a universal motor, a permanent magnet motor, a brushless DC (BLDC) motor, a brushed motor, an asynchronous motor, a synchronous motor, three-phase motor, etc. For discussion purposes, the control system 200 will be described with respect to embodiments where the motor 206 comprises an ECM 206.

Generally speaking, the ECM 206 may be used in any suitable application or system, such as in office, aerospace, military, or industrial applications and systems. For convenience, however, the following discussion will assume that the ECM 206 is to be used in the HVAC system 100. In some implementations, for example, the ECM 206 may be installed in an HVAC unit 208 such as the indoor fan 110, outdoor fan 118, compressor 116, furnace 150, or the like. Furthermore, the system controller 202 may comprise or be coupled to the system controller 106, indoor controller 124, outdoor controller 126, and/or compressor controller 144.

During operation of the control system 200, the electric drive module 204 may receive and execute commands from the system controller 202 to operate the ECM 206 at a desired rotational speed or torque. The electric drive module 204 may also monitor and report operating conditions of the ECM 206 and/or the HVAC unit 208 back to the system controller 202, which may use such reports to maintain and/or adjust operational parameters of the control system 200. In some scenarios, the electric drive module 204 and the ECM 206 may need to be calibrated. For example, the electric drive module 204 and the ECM 206 may be calibrated when first installed in the HVAC unit 208. In such scenarios, the electric drive module 204 and the ECM 206 may be calibrated by the manufacturer of the HVAC unit 208.

However, the electric drive module 204 and the ECM 206 may not necessarily be installed together. For instance, the electric drive module 204 and the ECM 206 may be purchased by different manufacturers. Similarly, the electric drive module 204 and the ECM 206 may need to be calibrated if either part is replaced, regardless if the replacement part is manufactured by the same or a different company. That is, even if the replacement part may share substantially similar properties as the original electric drive module 204 or ECM 206, calibration may still be needed because variations between the parts may be inevitable (e.g., due to slight differences in materials and/or operating conditions). In these scenarios, the electric drive module 204 and the ECM 206 may be calibrated using a similar approach as manufacturers, e.g., using a dynamometer to measure torque generated by the ECM 206.

Yet this approach may not be practical for some users since manufacturers typically use the dynamometer with a test fixture on an assembly to pair the electric drive module 204 and ECM 206. For example, if the electric drive module 204 and ECM 206 are separately purchased and installed in the HVAC unit 208, the electric drive module 204 and ECM 206 may be installed at different locations along the assembly line unless each part is carefully tracked, which can be relatively time-consuming. Moreover, this approach may not be convenient since the electric drive module 204 and ECM 206 may need to be calibrated in a controlled environment.

In an embodiment, the system controller 202 is configured to implement a method for dynamically calibrating the electric drive module 204 and ECM 206 once installed in the HVAC unit 208. For example, the system controller 202 may implement the method such that the electric drive module 204 and ECM 206 may be calibrated in the field where the HVAC unit 208 is normally located. In other words, the ECM 206 need not be calibrated in a controlled environment such as at a test facility or factory. Rather, the ECM 206 may be calibrated at any location in which the ECM 206 is presently located. As discussed further below with respect to FIGS. 3-5, the method involves estimating a calibration coefficient, $K_i$, to determine torque (T) from Root Mean Square (RMS) current ($I_{rms}$) based in part on the following relationship: $T=K_i*I_{rms}$.

Figure 3:
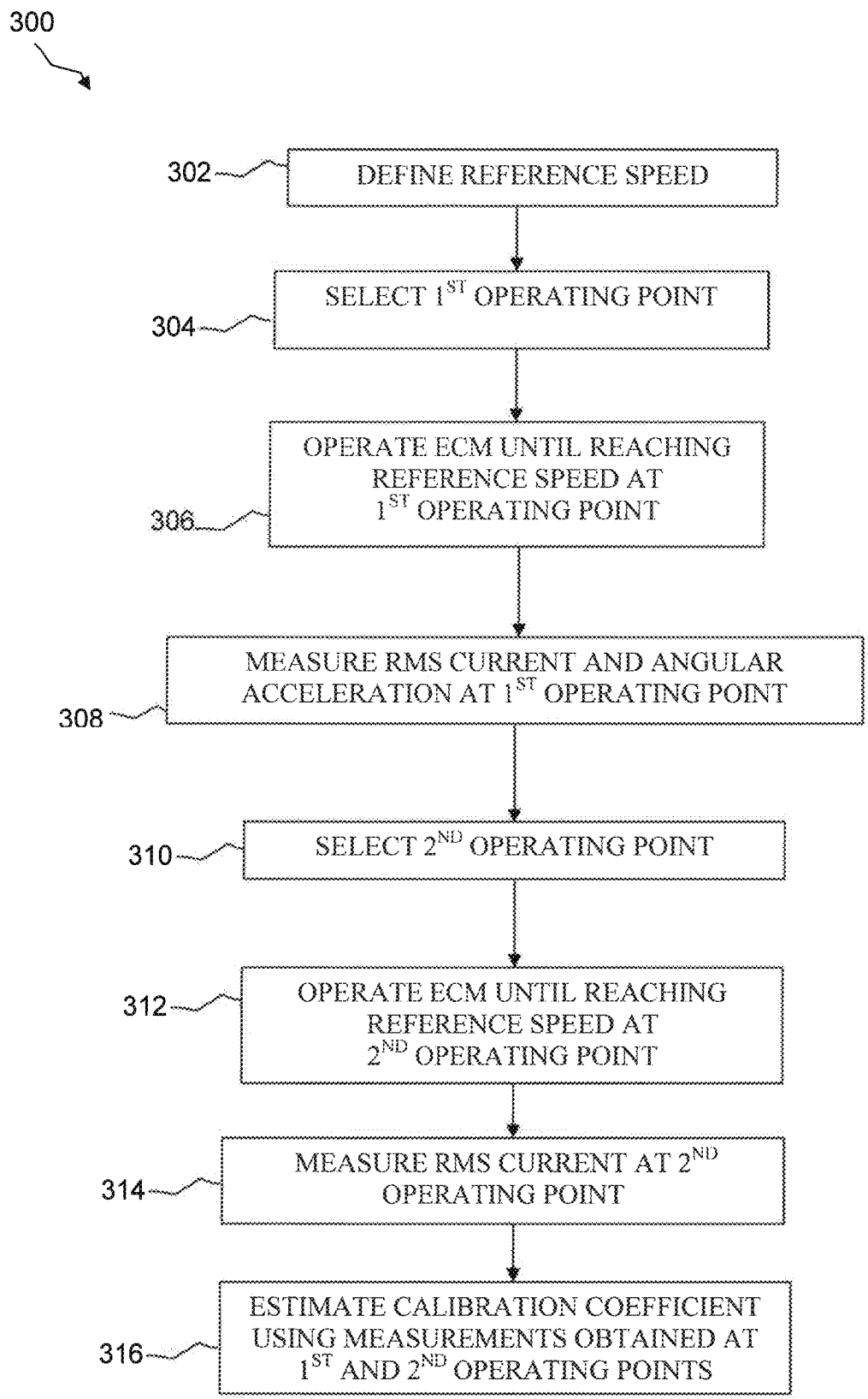
FIG. 3 is a flowchart for calibrating a motor according to an embodiment of the disclosure.

Referring now to FIG. 3, a method 300 is shown of calibrating the electric drive module 204 and ECM 206 according to an embodiment of the present disclosure. The operations may be performed in the order shown, or in a different order. Further, two or more of the operations may be performed concurrently instead of sequentially. The method 300 will be described in conjunction with FIG. 4, which shows graphs 402, 404, 406 of measurements observed over time (in seconds) according to an example of the method 300. In particular, graph 402 illustrates motor rotational speed measurements in terms of revolutions per minute (RPM); graph 404 illustrates RMS current measured in Amperes (Amps); and graph 406 illustrates motor angular acceleration measured in radians per second squared (rad/s$^2$).

The method 300 commences at block 302, where a reference speed is defined for the ECM 206. In the present example, the reference speed is defined as 600 RPM, but any suitable reference speed may be defined in other examples. Moreover, the method 300 may be repeated using different reference speeds to determine which reference speed or speeds provide optimal results. For instance, torque may generally be defined as a product of current and a certain constant, but torque values may be more or less accurate at different current levels. Therefore, the method 300 may be performed using two or more reference speeds (e.g., low, medium, and/or high) to assess performance at different operating points such as low- and high-end current levels. In some aspects, the method 300 may be performed to calculate an initial calibration coefficient (Ki), e.g., a default value. If necessary, the method 300 may then be repeated one or more times to adjust the initial calibration coefficient (Ki), e.g., to make the default value more precise and/or to yield one or more calibration coefficient values. For example, the initial calibration coefficient (Ki) may not be effective or otherwise applicable over an entire operating range of a particular motor. As such, the method 300 may be repeated to generate more than one calibration coefficient (Ki) over the entire operating range of that motor. In other aspects, the method 300 may be repeated periodically and/or triggered due to certain events, e.g., during start-up, when motor and/or motor drive operation falls outside acceptable performance, etc.

At block 304, the method 300 selects a first operating point at which the ECM 206 may either accelerate or decelerate to reach the reference speed defined at block 302. If the ECM 206 is currently off and not generating power to rotate a wheel, the first operating point may be selected to allow the ECM 206 to operate for an adequate duration such that the ECM 206 settles down before obtaining any measurements.

Figure 4:
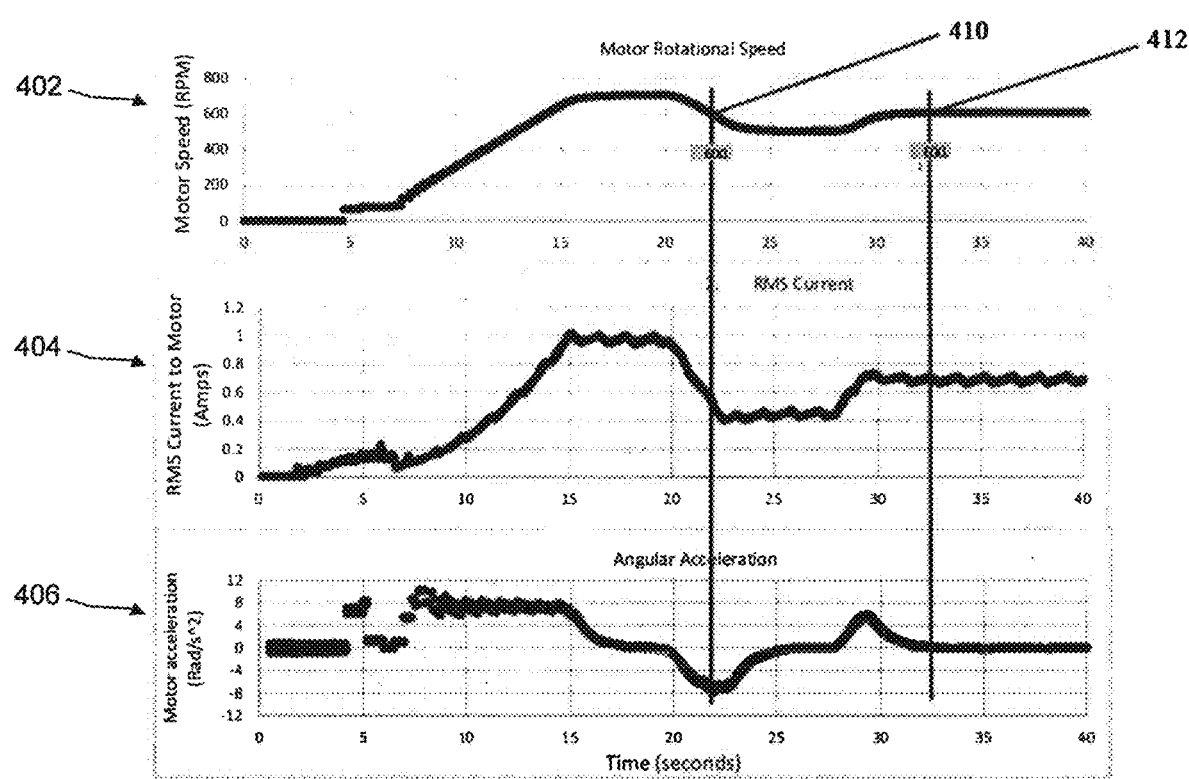
FIG. 4 depicts graphs of measurements associated with the flowchart of FIG. 3.

At block 306, the ECM 206 is operated until the reference speed is reached at the first operating point, which is denoted by line 410 in FIG. 4. As shown in graph 402, the reference speed of 600 RPM is reached in this example by decelerating the ECM 206 beginning about 20 seconds after operation. In other examples, the reference speed may be reached by decelerating the ECM 206 at any other suitable time after operation. Alternatively, the reference speed may be reached by accelerating the ECM 206 at about the same time as shown in graph 402, or at any other suitable time after operation. For instance, if the ECM 206 had already been running at block 304, an operator may opt to accelerate or decelerate the ECM 206 such that the reference speed is reached an earlier first operating point 410 than shown in graph 402.

At block 308, the method 300 measures RMS current ($I_{rms,1}$) and angular acceleration ($\alpha_1$) at the first operating point 410 as shown in graphs 404 and 404, respectively. At block 310, the method 300 selects a second operating point at which the ECM 206 reaches the reference speed while at a steady state (i.e., not accelerating or decelerating). At block 312, the ECM 206 is operated until the reference speed is reached at the second operating point, which is denoted by line 412 in FIG. 4. At block 314, the method 300 measures RMS current ($I_{rms,2}$) at the second operating point 412 as shown in graph 404. Unlike block 308, the method 300 may not measure angular acceleration at block 314 since the ECM 206 is operating at a constant speed. Therefore, the method 300 may deduce that the angular acceleration will be zero at the second operation point 412, as shown in graph 406.

At block 316, the method 300 may estimate the calibration coefficient ($K_i$) using the measurements obtained at the first and second operating points 410 and 412. In an embodiment, the calibration coefficient ($K_i$) may be estimated based on the following formula:

$$K_i = \frac{J\alpha_1}{I_{rms,1} - I_{rms,2}},$$

where
  J refers to inertia,
  $\alpha_1$ refers to the angular acceleration measured at the first operating point 410,
  $I_{rms,1}$ refers to the RMS current measured at the first operating point 410, and
  $I_{rms,2}$ refers to the RMS current measured at the second operating point 412.

In other embodiments, the calibration coefficient ($K_i$) may be derived from similar parameters as those in the equation above, but the overall equation may be modified. For example, the equation above may be more appropriate for a brushless DC motor rather than a 3-phase motor, or vice-versa. Thus, while the calibration coefficient ($K_i$) may generally be derived as a function of inertia and current for most types of motors, the equation above may be modified based upon a particular motor to be calibrated. Further, one or more equations for estimating the calibration coefficient ($K_i$) according to embodiments of the disclosure may employ additional and/or different parameters, e.g., current values such as $I_{rms,1}$ and $I_{rms,2}$ may be replaced by torque values.

In some implementations, the method 300 may estimate inertia (J) as being a known value based on speed conditions where aerodynamic loads of the ECM's 206 wheel may be negligible. In such implementations, for example, the method 300 may estimate rotational inertia as follows: $J\alpha=T_{motor}$. As such, torque at the first operating point 410 may be determined according to the following equation: $J\alpha_1=K_i*I_{rms,1}-T_{AERO,1}$, where $T_{AERO,1}$ refers to the aerodynamic load at the first operating point 410. Similarly, torque at the second operating point 412 may be determined according to the following equation: $J\alpha_2=K_i*I_{rms,2}-T_{AERO,2}$, where $\alpha_2$ and $T_{AERO,2}$ refer to the respective angular acceleration and aerodynamic load at the second operating point 412. As previously discussed, the ECM 206 operates at a constant speed at the second operating point 412. Consequently, the angular acceleration at the second operating point 412 is zero (i.e., $\alpha_2=0$).

It is noted that when the ECM 206 is operating at the first and second operation points 410 and 412, the aerodynamic loads ($T_{AERO,1}$, $T_{AERO,2}$) may not be known since a calibrated torque signal has not yet been derived by the method 300. However, because the ECM 206 operates at the same reference speed (e.g., 600 RMP) at the first and second operation points 410 and 412, the method 300 may deduce that the same aerodynamic load is present at both operating points 410 and 412 (i.e., $T_{AERO,1}=T_{AERO,2}$).

Hence, the method 300 may simply cancel out the unknown aerodynamic loads and apply a summation of torques at the first and second operating points 410 and 412 to solve for the unknown calibration coefficient ($K_i$), which may then be used to calibrate the ECM 206 and corresponding electric drive module 204 by relating torque to current.

For example, the unknown calibration coefficient ($K_i$) may be calculating by mathematically reducing the two torque equations noted above as follows: $J\alpha_1 = K_i*I_{rms,1} - K_i*I_{rms,2}$, where $K_i = J\alpha_1/(I_{rms,1} - I_{rms,2})$. Accordingly, the method 300 may then estimate the calibration coefficient ($K_i$) using the known estimate of inertia (J). In some implementations, the known estimate of inertia (J) value may be derived from experimental testing in the field and/or laboratory. Additionally or alternatively, the known estimate of inertia (J) value may be derived through experimental simulations and/or modeling.

In other implementations, the method 300 may estimate the actual inertia (J) rather than utilize a known estimate. In such implementations, for example, the method 300 may select a third operating point (not shown) at which the ECM 206 continues to operate until reaching the reference speed defined in block 302. Upon reaching the third operating point (e.g., via acceleration or deceleration), the method 300 may measure RMS current ($I_{rms,3}$) and angular acceleration ($\alpha_3$). Again, the method 300 may deduce that the aerodynamic load at the third operating point is the same as at operating points 410 and 412 (i.e., $T_{AERO,1} = T_{AERO,2} = T_{AERO,3}$) since the ECM 206 runs at the same reference speed at all three operating points. Thus, the method 300 may cancel out the aerodynamic loads and solve for the unknown inertia (J) using a third torque equation based on the RMS current ($I_{rms,3}$) and angular acceleration ($\alpha_3$) measurements from the third operating point.

In some embodiments, the method 300 may estimate torque values during regular operation of the motor, but without measuring current. For instance, in examples where a reference speed is reached by decelerating the ECM 206, the method 300 may measure deceleration of the blower or fan (e.g., indoor fan 110 or outdoor fan 118) associated with the ECM 206. In turn, the method 300 may estimate torque based on the measured deceleration such as described in U.S. Pat. No. 4,638,233, which is herein incorporated in its entirety by reference.

Figure 5:
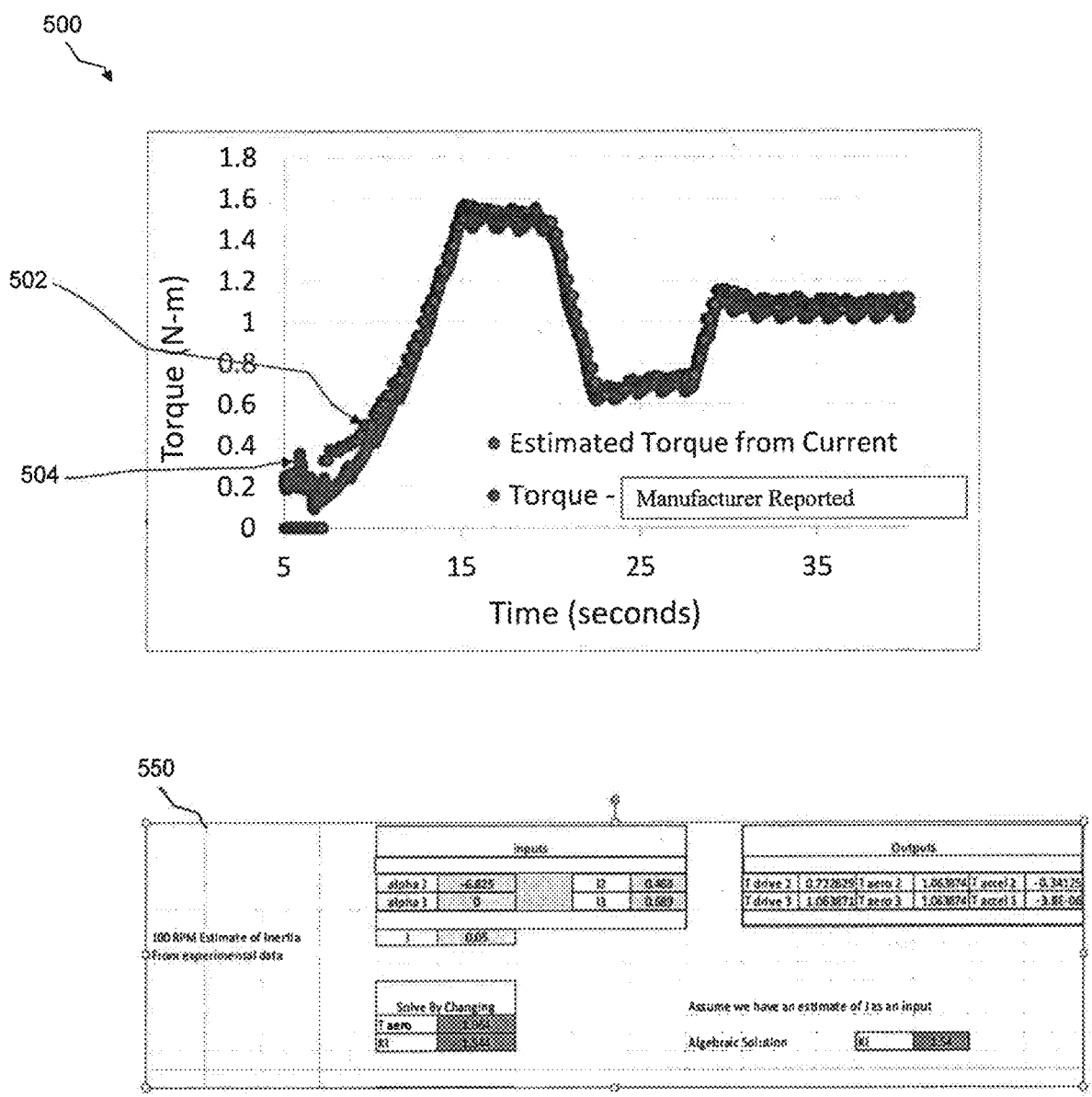
FIG. 5 is a graph of an example comparing actual torque values and estimated torque values.

FIG. 5 depicts an example of a graph 500 comparing actual torque values and estimated torque values associated with the ECM 206. In particular, line 502 denotes torque values generated based on the ECM 206 being calibrated by the manufacturer of the ECM 206, whereas line 504 denotes torque values estimated to be generated based on the ECM 206 being calibrated by the method 300 of FIG. 3. The latter torque values correspond to an example based on the method 300 using parameters shown in box 550 to calculate the calibration coefficient ($K_i$) at block 316. For example, using a known estimate of inertia (J) equal to 0.05 kilogram (kg) metre (m) squared (kg-m²), the method 300 calculated the calibration coefficient ($K_i$) as being equal to 1.54. It is apparent from the graph 500 that the values denoted by line 502 mostly align with the values denoted by line 504.

Accordingly, the method 300 method 300 disclosed herein may be employed to automatically calibrate an ECM 206 and corresponding electric drive module 204 at nearly suitable location (e.g., in-house or in-field), as the method 300 is adaptive to the environment in which the ECM 206 and electric drive module 204 are located. For instance, the method 300 need not rely upon a precisely controlled environment or testing facility. Similarly, the method 300 need not rely upon large quantities of predetermined information such as reference torque values, airflows, RPMs, or the like.

As such, if the ECM 206 or electric drive module 204 becomes damaged and needs to be replaced, the system controller 202 may be configured to self-calibrate the ECM 206 and drive module 204 on the spot. For example, the system controller 202 may be programmed to automatically initiate the method 300 once the damaged part is replaced and installed in the HVAC unit 208. Further, the method 300 may be performed regardless of the brand, model, or components of the ECM 206 and/or electric drive module 204. Accordingly, the method 300 may serve as a "universal" calibration procedure capable of calibrating different combinations of motors and electric drive modules in various different units (i.e., not only HVAC unit 208, but any suitable unit comprising a motor and electric drive).

Figure 6:
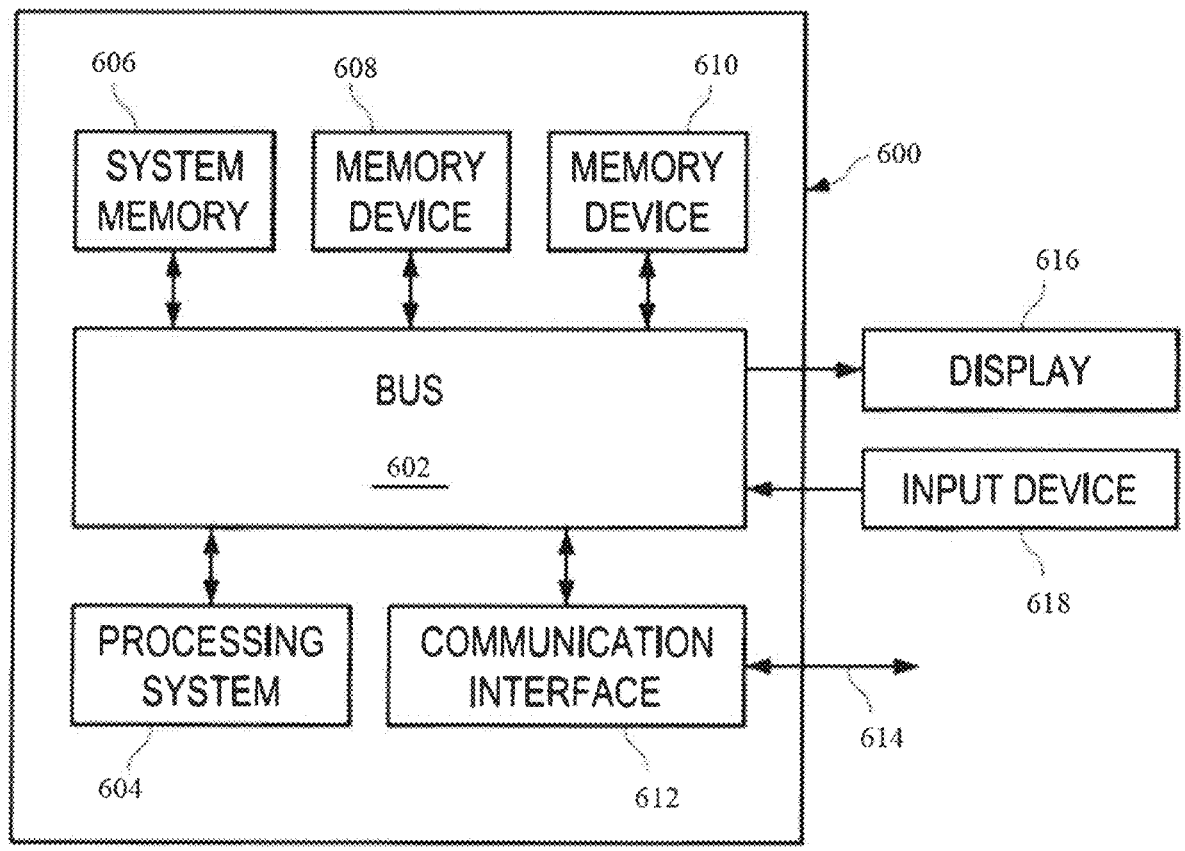
FIG. 6 is an example of a computing system according to an embodiment of the disclosure.

In some aspects, the various blocks, modules, circuits, methods, and systems disclosed herein may be implemented on any general-purpose network component, such as a computer or network component with sufficient processing power, memory resources, and network throughput capability to handle the necessary workload placed upon it. For example, FIG. 6 illustrates a block diagram of a computing system 600 capable of implementing aspects of the systems and methods disclosed herein and depicted in FIGS. 1-5. The system 600 may include various systems and subsystems. The system 600 may comprise a personal computer, a laptop computer, a workstation, a computer system, an appliance, a "smart" phone, an Application-Specific Integrated Circuit (ASIC), a server, a server blade center, a server farm, etc.

As shown in FIG. 6, the system 600 may comprise a system bus 602, a processing unit or system 604, a system memory 606, memory devices 608 and 610, a communication interface 612 (e.g., a network interface), a communication link 614, a display 616 (e.g., a video screen), and an input device 618 (e.g., a keyboard and/or a mouse). The system bus 602 can be in communication with the processing system 604 and the system memory 606. The additional memory devices 608 and 610, such as a hard disk drive, server, stand-alone database, or other non-volatile memory, can also be in communication with the system bus 602. The system bus 602 interconnects the processing system 604, the memory devices 606, 608, and 610, the communication interface 612, the display 616, and the input device 618. In some examples, the system bus 602 also interconnects an additional port (not shown), such as a universal serial bus (USB) port.

The processing system 604 may comprise a computing device and include an ASIC. The processing system 604 may further include a processing core. The processing system 604 is capable of executing a set of instructions to implement the various operations of disclosed herein.

The additional memory devices 606, 608, and 610 can store data, programs, instructions, database queries in text or compiled form, and any other information that can be needed to operate a computer. The memories 606, 608, and 610 can be implemented as computer-readable media (integrated or removable) such as a memory card, disk drive, compact disk (CD), or server accessible over a network. In certain examples, the memories 606, 608, and 610 can comprise text, images, video, and/or audio, portions of which can be available in formats comprehensible to human beings. Additionally or alternatively, the system 600 can access an external data source or query source through the communication interface 612, which may communicate with the system bus 602 and the communication link 614. In some aspects, the communication interface 612, system bus 602, and/or communication link 614 may be communicatively coupled to one another via a wired or wireless communication link, such as an IEEE 802.11 wireless network, an IEEE 802.3 wired network, or any other suitable wired or wireless communication technology.

Computer executable logic for implementing the system control may reside on one or more of the system memory 606, and the memory devices 608 and 610. The processing system 604 may be configured to execute one or more computer executable instructions originating from the system memory 606 and the memory devices 608 and 610. The term "computer readable medium" as used herein may refer to any suitable medium that participates in providing instructions to the processing system 604 for execution, and can include either a single medium or multiple non-transitory media operatively connected to the processing system 604.

Furthermore, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value.

Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A control system, comprising:
   a motor; and
   a control unit communicatively coupled to the motor, the control unit being configured to calibrate the motor by:
   defining a reference speed for operating the motor;
   during a first time period, accelerating or decelerating the motor through the reference speed;
   measuring a first current of the motor and an angular acceleration when the motor achieves the reference speed during the first time period;
   during a second time period, maintaining the motor in a steady state at the reference speed;
   measuring a second current of the motor when the motor is at the reference speed during the second time period; and
   estimating a calibration coefficient for calibrating the motor based at least on the first current, the second current, and the angular acceleration.

2. The control system of claim 1, wherein estimating the calibration coefficient is further based on the control unit determining that angular acceleration associated with the second current is zero.

3. The control system of claim 1, wherein estimating the calibration coefficient is further based on the following equation:

$$K_i = \frac{J\alpha_1}{I_{rms,1} - I_{rms,2}},$$

wherein $K_i$ refers to the calibration coefficient, J refers to inertia, $\alpha_1$ refers to the angular acceleration associated with the first current, $I_{rms,1}$ refers to the first current, and $I_{rms,2}$ refers to the second current.

4. The control system of claim 3, wherein estimating the calibration coefficient is further based on using a known estimate of inertia (J).

5. The control system of claim 1, wherein the motor comprises an electronically commutated motor (ECM) coupled to an electric drive module configured to power the ECM, and wherein the control unit is configured to calibrate the ECM and the electric drive module regardless of whether the ECM and the electric drive module are manufactured by different manufacturers.

6. A method for calibrating a motor, the method comprising:
   defining a reference speed for operating the motor;
   during a first time period, accelerating or decelerating the motor through the reference speed;
   measuring a first current of the motor and an angular acceleration when the motor achieves the reference speed during the first time period;
   during a second time period, maintaining the motor in a steady state at the reference speed;
   measuring a second current of the motor when the motor is at the reference speed during the second time period; and
   estimating a calibration coefficient for calibrating the motor based at least on the first current, the second current, and the angular acceleration.

7. The method of claim 6, wherein estimating the calibration coefficient is further based on a control unit determining that angular acceleration associated with the second current is zero.

8. The method of claim 6, wherein estimating the calibration coefficient is further based on the following equation:

$$K_i = \frac{J\alpha_1}{I_{rms,1} - I_{rms,2}},$$

wherein $K_i$ refers to the calibration coefficient, J refers to inertia, $\alpha_1$ refers to the angular acceleration associated with the first current, $I_{rms,\,1}$ refers to the first current, and $I_{rms,\,2}$ refers to the second current.

9. The method of claim 8, wherein estimating the calibration coefficient is further based on using a known estimate of inertia (J).

10. The method of claim 6, wherein the motor comprises an electronically commutated motor (ECM) coupled to an electric drive module configured to power the ECM, and wherein the control unit is configured to calibrate the ECM and the electric drive module regardless of whether the ECM and the electric drive module are manufactured by different manufacturers.

11. A non-transitory computer medium storing computer readable instructions executable by a processor to implement a method for calibrating a motor, the method comprising:
defining a reference speed for operating the motor;
during a first time period, accelerating or decelerating the motor through the reference speed;
measuring a first current of the motor and an angular acceleration when the motor achieves the reference speed during the first time period;
during a second time period, maintaining the motor in a steady state at the reference speed;
measuring a second current of the motor when the motor is at the reference speed during the second time period; and
estimating a calibration coefficient for calibrating the motor based at least on the first current, the second current, and the angular acceleration.

12. The non-transitory computer medium of claim 11, wherein estimating the calibration coefficient is further based on a control unit determining that angular acceleration associated with the second current is zero.

13. The non-transitory computer medium of claim 12, wherein estimating the calibration coefficient is further based on the following equation:

$$K_i = \frac{J\alpha_1}{I_{rms,1} - I_{rms,2}},$$

wherein $K_i$ refers to the calibration coefficient, J refers to inertia, $\alpha_1$ refers to the angular acceleration associated with the first current, $I_{rms,\,1}$ refers to the first current, and $I_{rms,\,2}$ refers to the second current.

14. The non-transitory computer medium of claim 13, wherein estimating the calibration coefficient is further based on using a known estimate of inertia (J).

* * * * *